(12) United States Patent
Taillon et al.

(10) Patent No.: US 8,254,015 B2
(45) Date of Patent: Aug. 28, 2012

(54) SYSTEM AND METHOD FOR THE SPATIAL TAILORING OF LASER LIGHT USING TEMPORAL PHASE MODULATION

(75) Inventors: Yves Taillon, St-Augustin-de-Desmaures (CA); Mathieu Drolet, Ste-Marthe sur le Lac (CA); David Gay, Québec (CA); Louis Desbiens, St-Augustin-de-Desmaures (CA); Brian W. Baird, Portland, OR (US)

(73) Assignee: Institut National d'Optique, Quebec, Quebec (CA)

( * ) Notice: Subject to any disclaimer, the term of this patent is extended or adjusted under 35 U.S.C. 154(b) by 73 days.

(21) Appl. No.: 12/978,126

(22) Filed: Dec. 23, 2010

(65) Prior Publication Data

US 2011/0170163 A1    Jul. 14, 2011

Related U.S. Application Data

(60) Provisional application No. 61/289,767, filed on Dec. 23, 2009.

(51) Int. Cl.
*G02F 1/01* (2006.01)

(52) U.S. Cl. ........................................ 359/279

(58) Field of Classification Search .................. 359/237, 359/245, 279, 282, 283; 372/6, 26, 29.022, 372/100, 50.11, 102
See application file for complete search history.

(56) References Cited

U.S. PATENT DOCUMENTS

| | | | |
|---|---|---|---|
| 7,946,708 B2 * | 5/2011 | Sakata et al. | 353/13 |
| 2010/0128744 A1 | 5/2010 | Deladurantaye et al. | |

* cited by examiner

*Primary Examiner* — David N Spector
*Assistant Examiner* — Tuyen Tra
(74) *Attorney, Agent, or Firm* — Merchant & Gould P.C.

(57) ABSTRACT

Laser systems and methods for providing an output light beam having a target spatial pattern are provided. A light generating module generates an input light beam, whose spectral profile is then tailored by imposing thereon a controllable phase modulation. The obtained spectrally tailored light beam is dispersed, using at least one spatially-dispersive element to provide an output light beam having a spatial profile which is a function of the spectral profile of the spectrally tailored light beam, The phase modulation is selected in view of the spectral profile of the input light beam and of the dispersion characteristics of the at least one spatially-dispersive element so that the spatial pattern of the output light beam matches the target spatial pattern therefor.

27 Claims, 12 Drawing Sheets

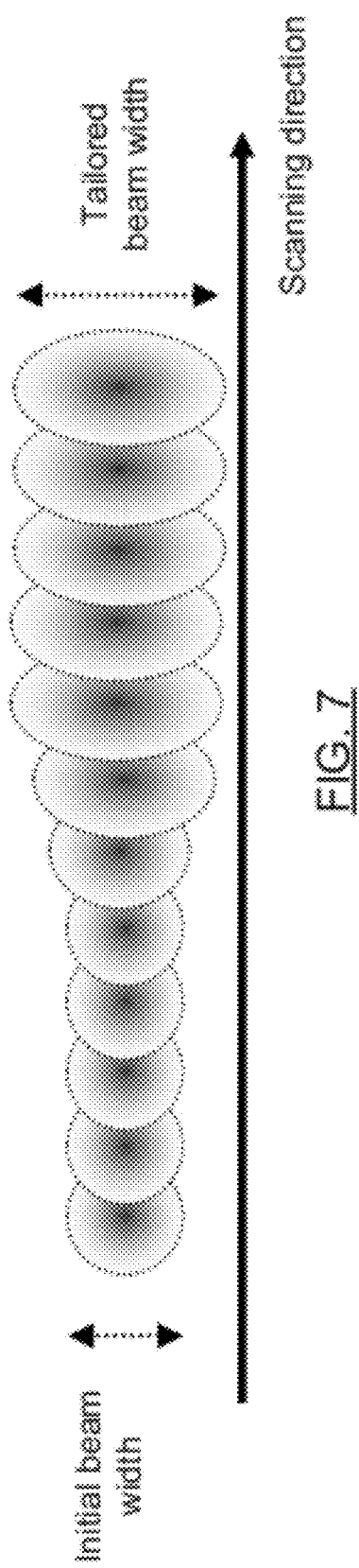

SYSTEM AND METHOD FOR THE SPATIAL TAILORING OF LASER LIGHT USING TEMPORAL PHASE MODULATION

This application claims benefit of Ser. No. 61/289,767, filed 23 Dec. 2009 in the United States and which application is incorporated herein by reference. To the extent appropriate, a claim of priority is made to each of the above disclosed applications.

FIELD OF THE INVENTION

The present invention relates to lasers and more particularly concerns a method for to controlling the spatial properties of a laser beam by introducing a temporal modulation of its phase.

BACKGROUND

Agile and adaptable lasers are currently in demand for a number of applications and uses. For example, numerous material processing applications such as milling, micro-fabrication, drilling, memory repair, etc. require pulsed laser systems which provide, among others, high pulse energy (50 µJ or higher), excellent pulse power stability, excellent beam quality ($M^2$<1.1, astigmatism<10%, beam roundness>95%) and narrow linewidth ($\Delta\lambda$<0.5 nm). Moreover, great flexibility is often required in the control of the pulse temporal profile, such as pulse to pulse control over the temporal profile at low, medium and high (>100 kHz) repetition rates.

In some applications, in particular with respect to material processing using high power lasers, it can be advantageous to control or modify the spatial properties of the outputted light, such as the width of the beam or the spatial distribution of power therein. In addition, laser processing of materials often requires scanning the laser beam on a surface of a workpiece. It can thus be useful to actively control the spatial distribution of power.

When using pulsed light it may, in some cases, be useful to control the pulse-to-pulse beam overlap along the scanning axis. This pulse-to-pulse overlap ($O_{p-p}$) is defined as:

$$O_{p-p} = 1 - \frac{V_{scan}}{D_{beam} \times R_{pulse}},$$

where the beam diameter $D_{beam}$ corresponds to the dimension of the beam in the direction of the scanning axis, $V_{scan}$ is the scanning speed and $R_{pulse}$ is the pulse repetition rate.

This pulse-to-pulse overlap can be a critical parameter for the quality of the process results as well as for its efficiency. Furthermore, complex beam scanning and displacement systems can be burdensome for efficient processing.

In view of the above, there remains a need in the art for tools providing the efficient and active control of the spatial properties of high power laser beams, especially for material processing where the output beam spatial pattern can be controlled with non moving components at very high speed.

SUMMARY OF THE INVENTION

In accordance with one aspect of the invention, there is provided a laser system for providing an output light beam having a target spatial pattern.

The laser system first includes a light generating module generating an input light beam having a spectral profile. The laser system further includes a spectral tailoring module for providing a spectrally tailored light beam with a given spectral profile of the input light beam. The spectral tailoring module includes at least one phase modulator imposing on the input light beam a controllable phase modulation modifying the spectral profile thereof.

The laser system also includes a dispersion module disposed downstream the spectral tailoring module and receiving the spectrally tailored light beam therethrough. The dispersion module has at least one spatially-dispersive element, the at least one spatially-dispersive element having dispersion characteristics dispersing the spectrally tailored light beam to provide an output light beam having a spatial pattern which is a function of the spectral profile of the spectrally tailored light beam. The phase modulation is selected in view of the spectral profile of the input light beam and of the dispersion characteristics of the at least one spatially-dispersive element, so that the spatial pattern of the output light beam matches the target spatial pattern therefor.

In accordance with another aspect of the invention, there is also provided a method for providing an output light beam having a target spatial pattern, the method includes:
a) generating an input light beam having a spectral profile;
b) tailoring the spectral profile of the input light beam by imposing on this input light beam a controllable phase modulation modifying the spectral profile thereof, thereby obtaining a spectrally tailored light beam;
c) dispersing, using at least one spatially-dispersive element having dispersion characteristics, the spectrally tailored light beam to provide an output light beam having a spatial pattern which is a function of the spectral profile of the spectrally tailored light beam, wherein the phase modulation is selected in view of the spectral profile of the input light beam and of the dispersion characteristics of the at least one spatially-dispersive element so that spatial pattern of the output light beam matches the target spatial pattern therefor.

Embodiments of the invention may provide a method and an apparatus for controlling the transverse width of light beams, the overlap of light pulses, or generating a multiplicity of light beams spatially distributed according to a target spatial pattern. Since this method is based on electronic control, it can allow rapid and customizable changes, without any modifications to the physical optical system neither use of mechanical moving parts, which is a great advantage for advanced micromachining.

Other features and advantages of the present invention will be better understood upon reading of the description of the preferred embodiments thereof with reference to the appended drawings.

2D illustrates a spectral profile taking the form of a continuous spectral distribution with a complex shape.

Figure 3:
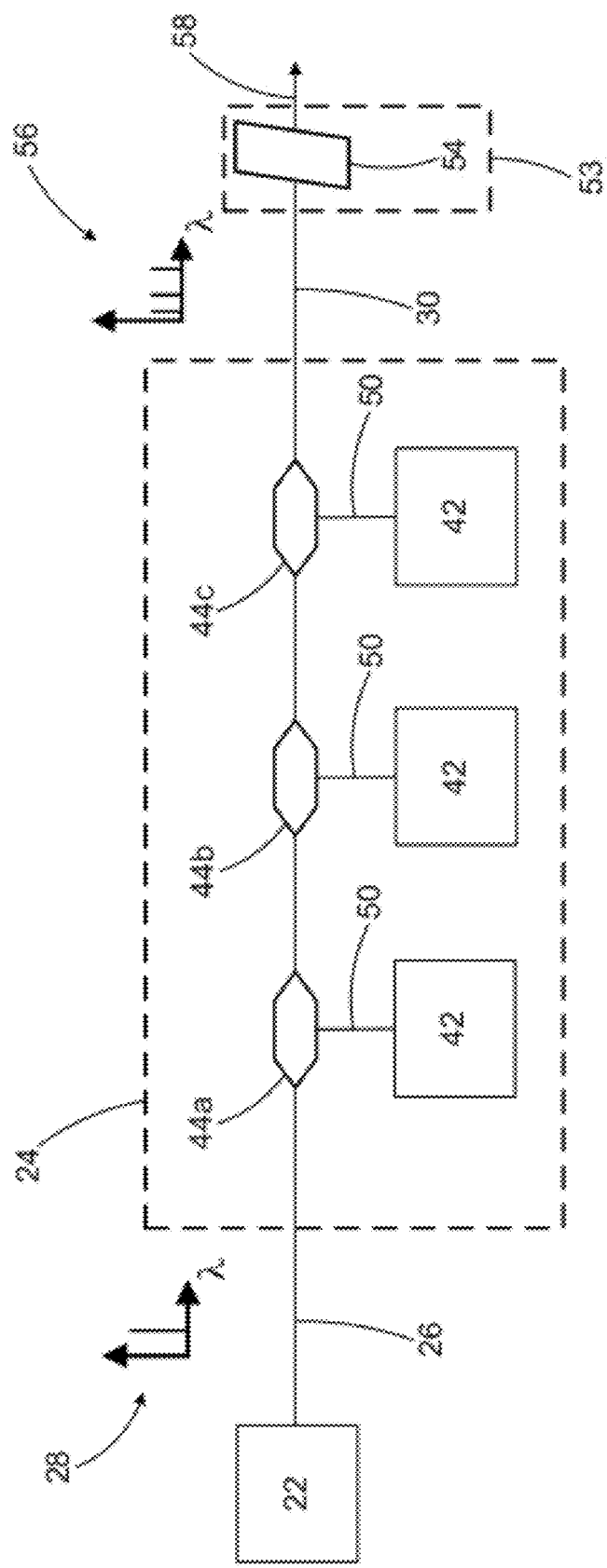

FIG. 3 schematically illustrates a laser system according to another embodiment of invention.

Figure 4:
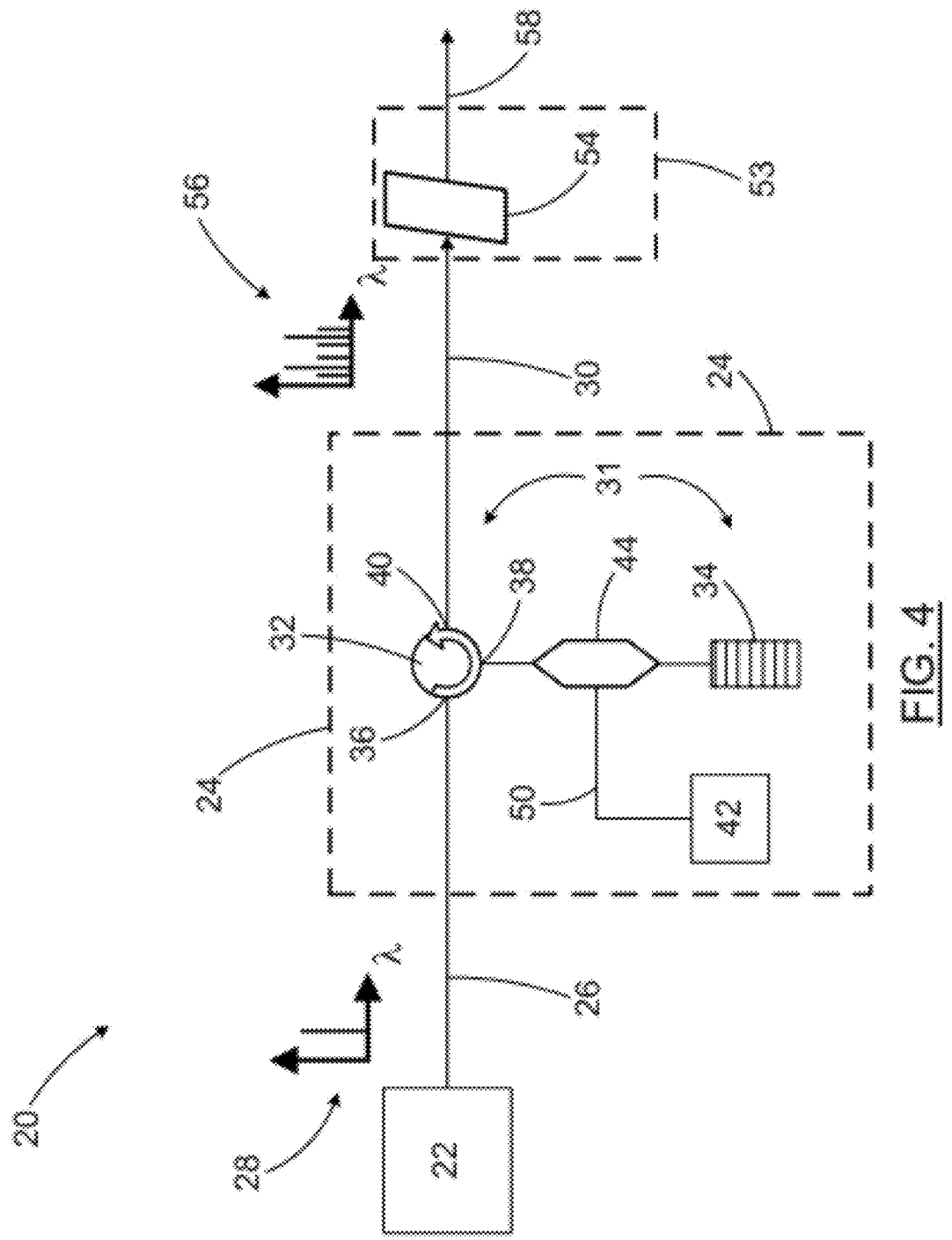

FIG. 4 schematically illustrates a laser system according to yet another embodiment of invention.

Figure 1A:
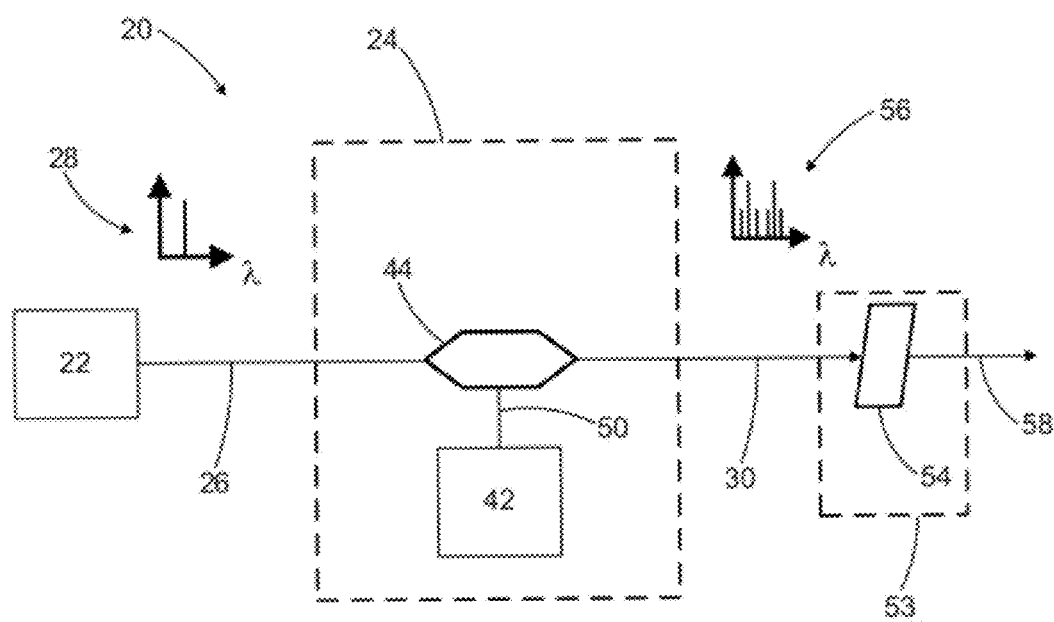
FIG. 1A schematically illustrates a laser system according to one embodiment of the invention.
Figure 5:
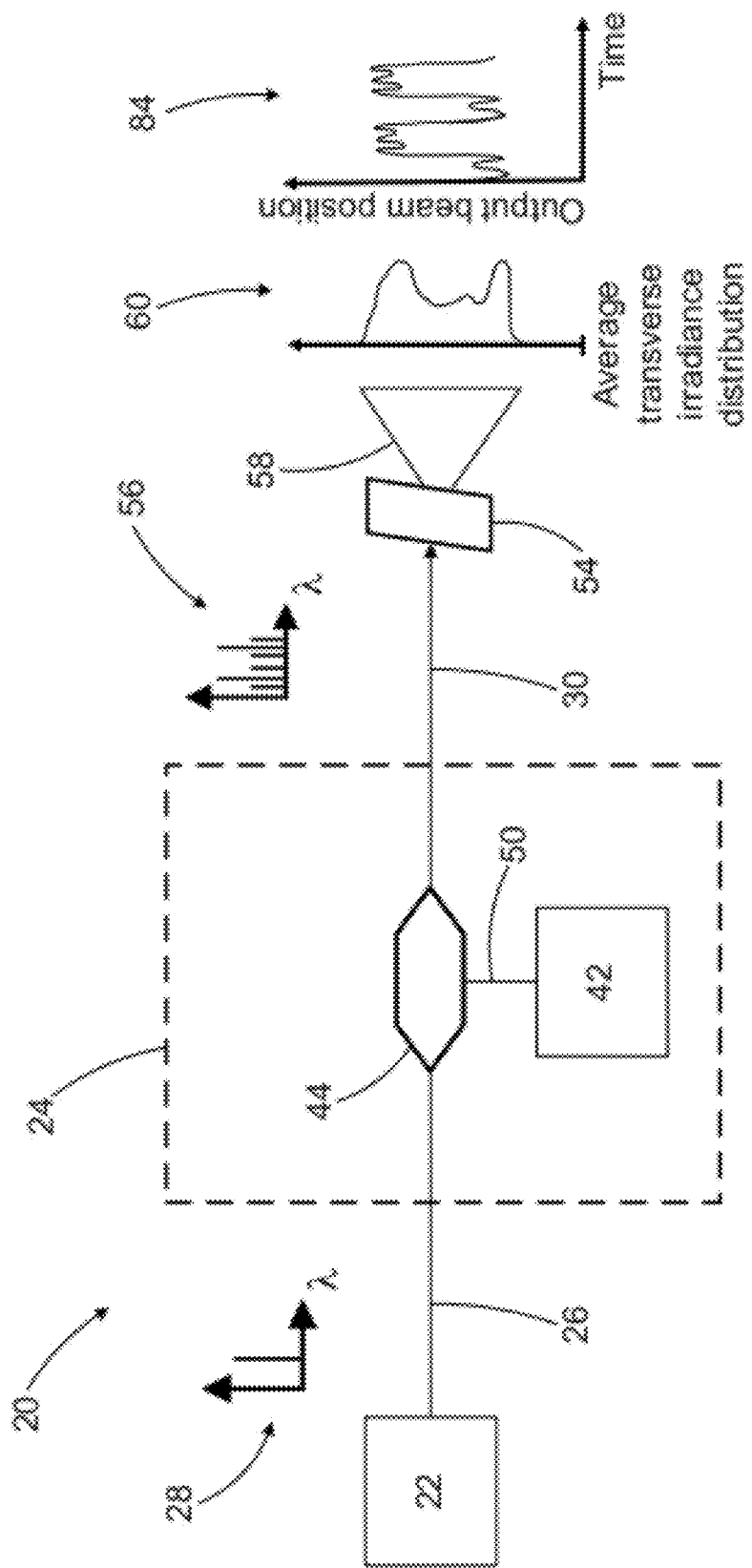

FIG. 5 schematically illustrates a tailored beam shape obtained with the system of FIG. 1A.

Figure 6A:
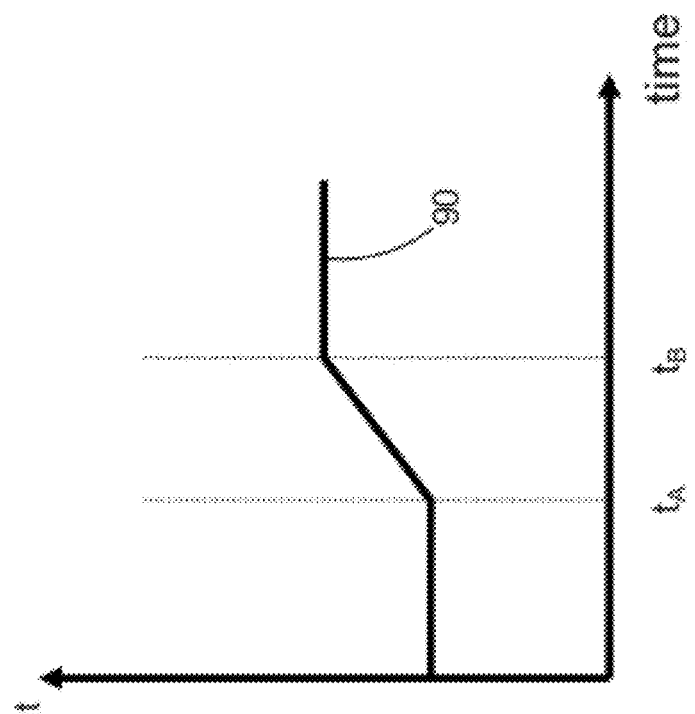
Figure 6B:
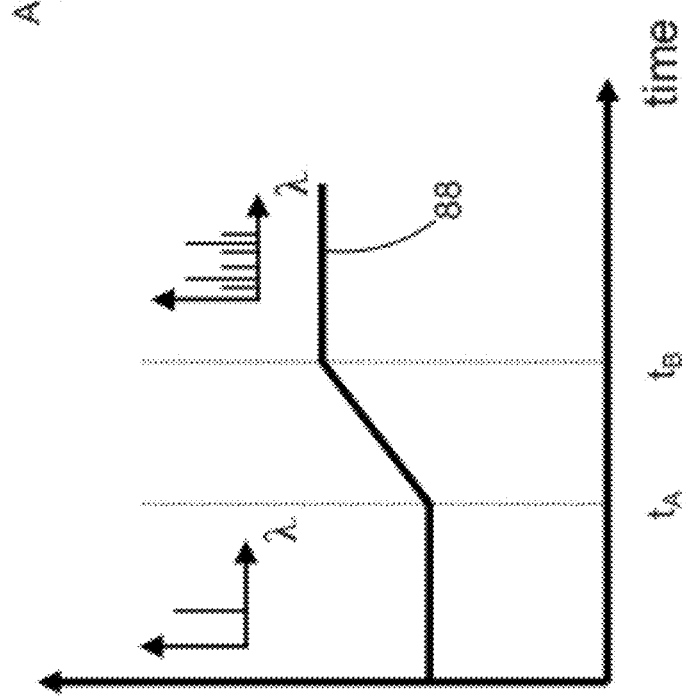

FIGS. 6A and 6B are graphs respectively showing the spectral and spatial width as a function of the time for the output beam of a system according to an embodiment of the invention.

FIG. 7 schematically illustrates the evolution of the beam shape perpendicular to the scanning axis for a typical material processing groove width control application obtained using an embodiment of the invention.

Figure 8:
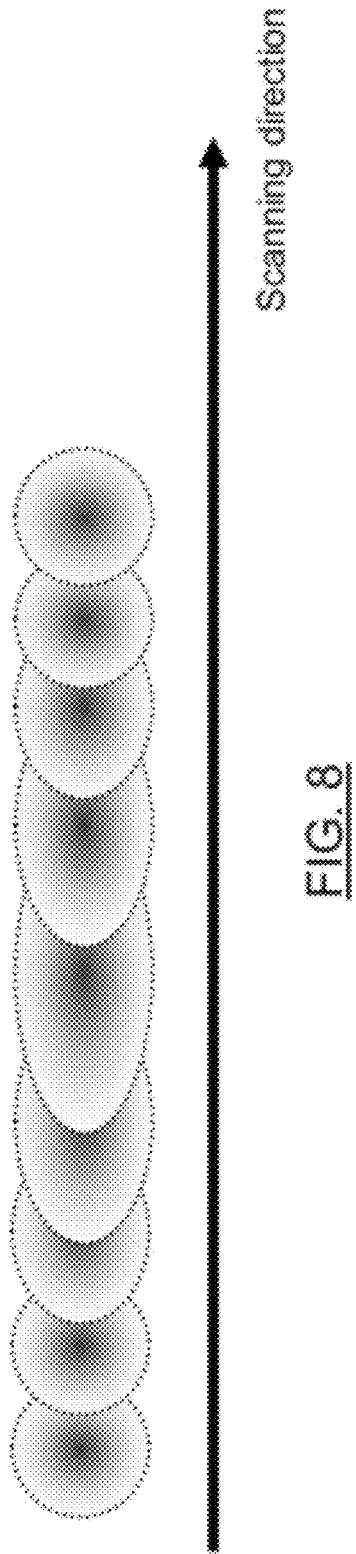

FIG. 8 schematically illustrates the evolution of the beam shape along the scanning axis for a typical material processing pulse-to-pulse overlap control application obtained using an embodiment of the invention.

Figure 9:
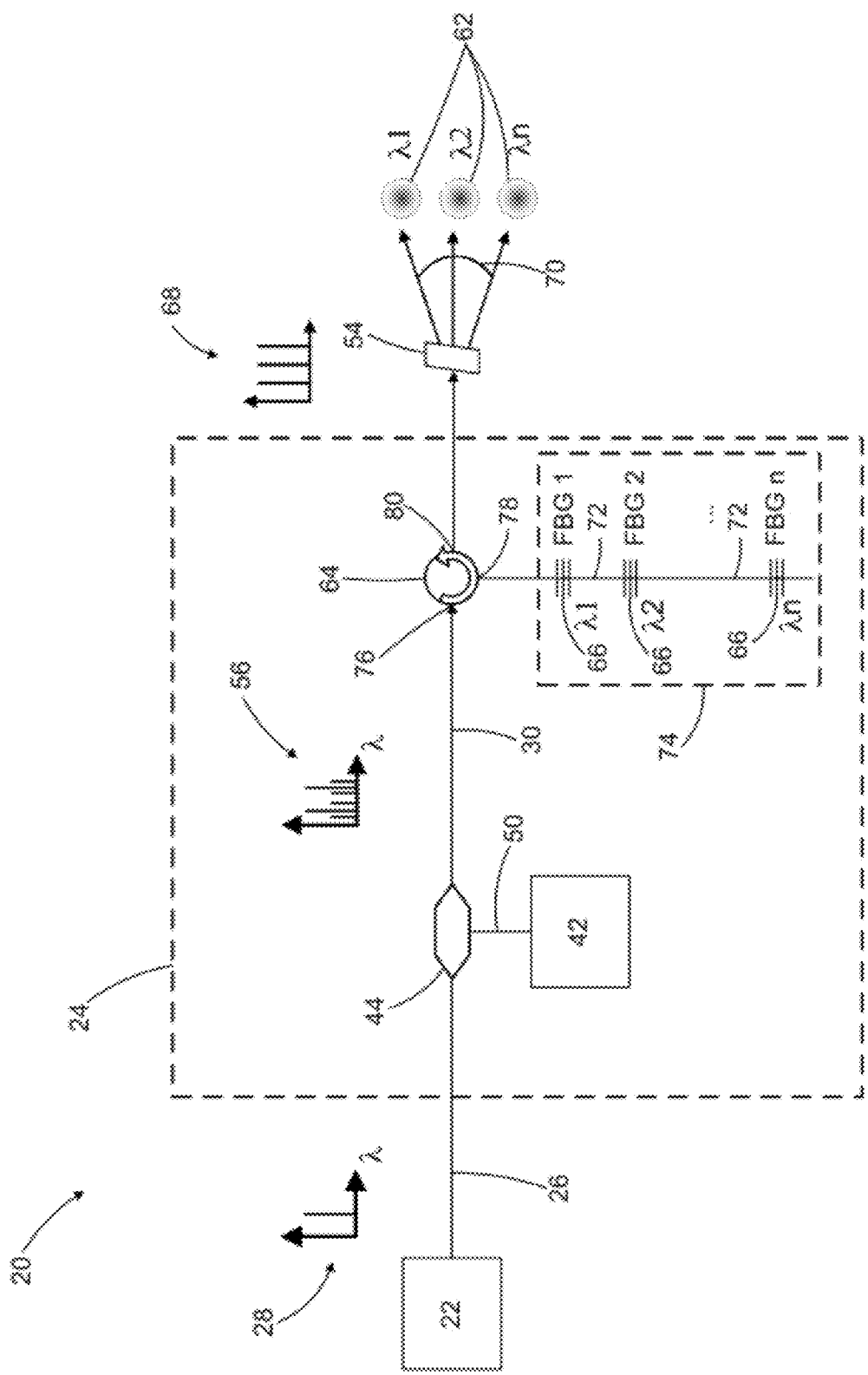

FIG. 9 schematically illustrates a laser system according to an embodiment of the invention, used for the generation of multiple laser beams.

Figure 10A:
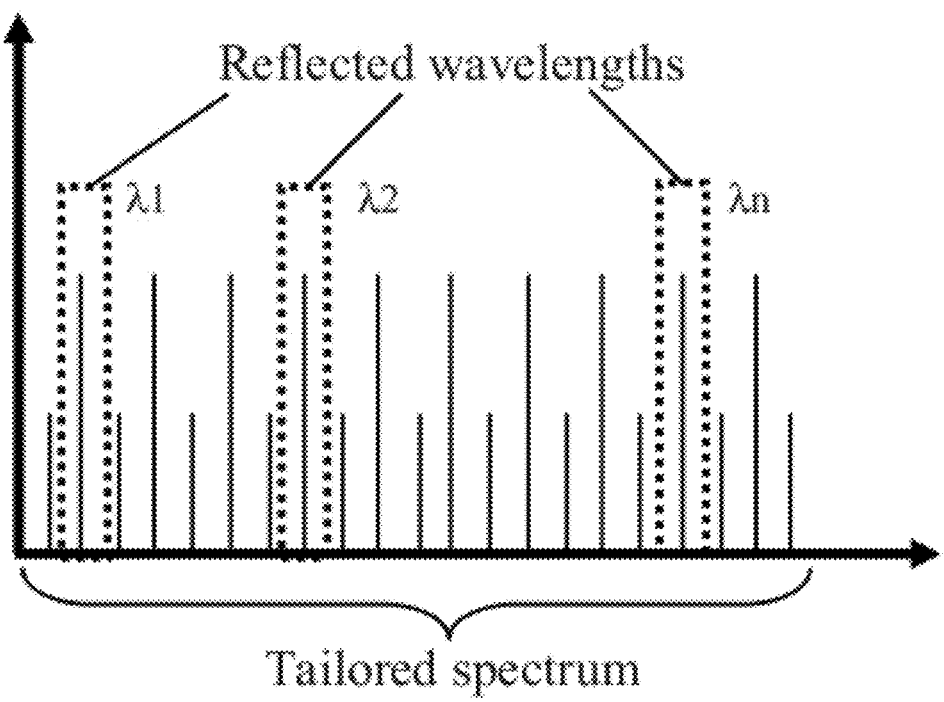
Figure 10B:
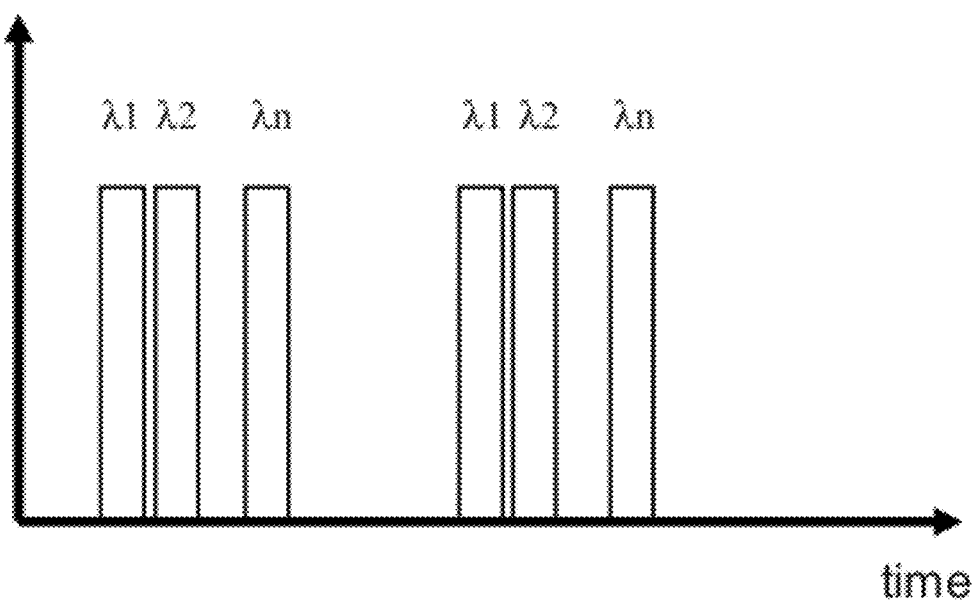

FIG. 10A is a graph illustrating the selection of wavelengths with fiber Bragg gratings (FBGs) in the system of FIG. 9; FIG. 10B is a graph illustrating the time-delay of the N different beams selected in FIG. 10A.

Figure 11:
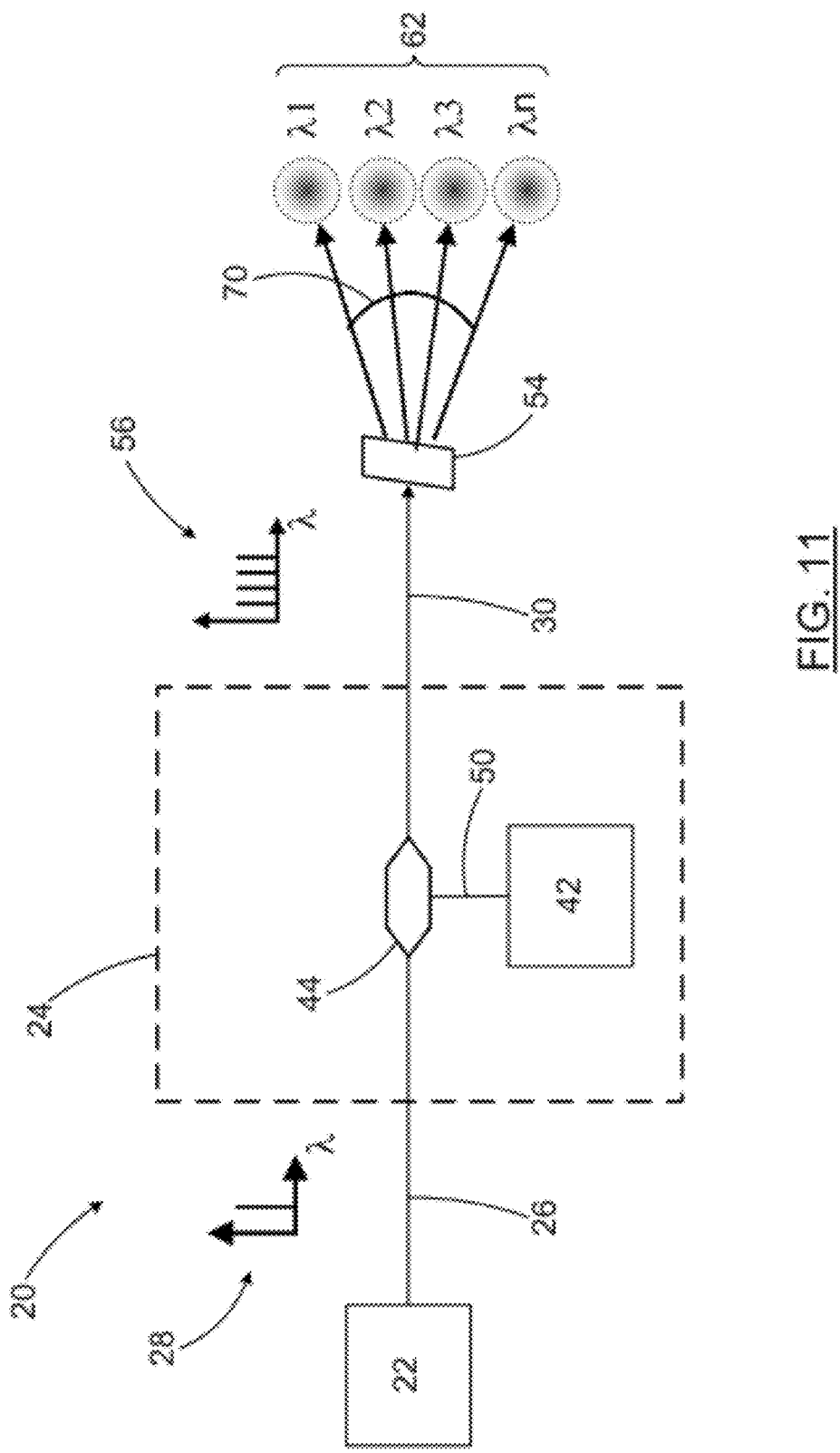

FIG. 11 schematically illustrates a laser system according to another embodiment of the invention for the generation of multiple laser beams.

Figure 12A:
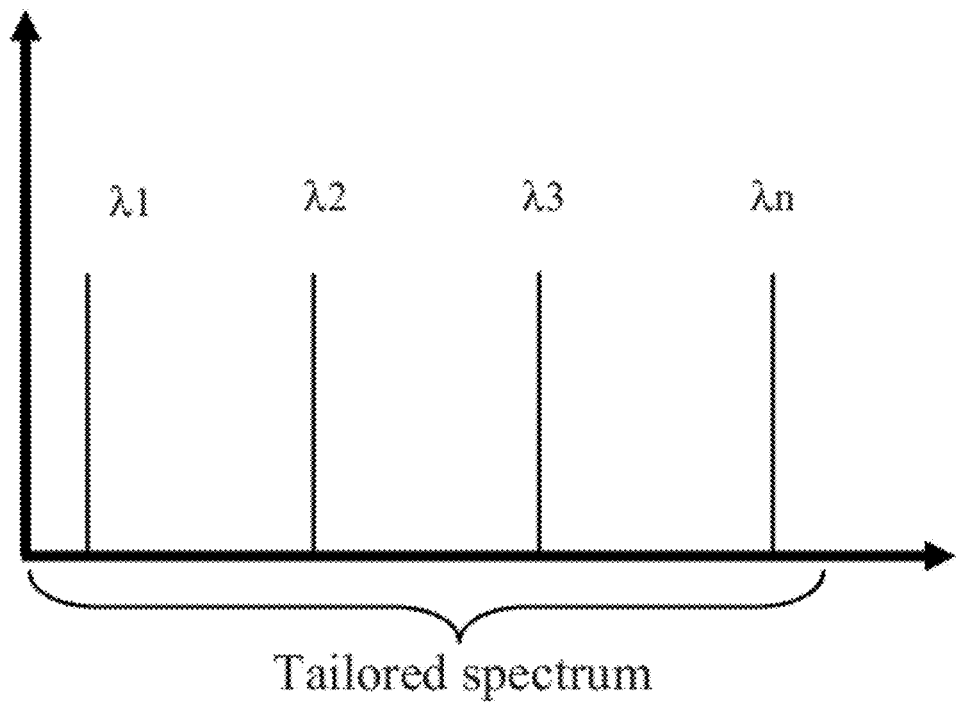
Figure 12B:
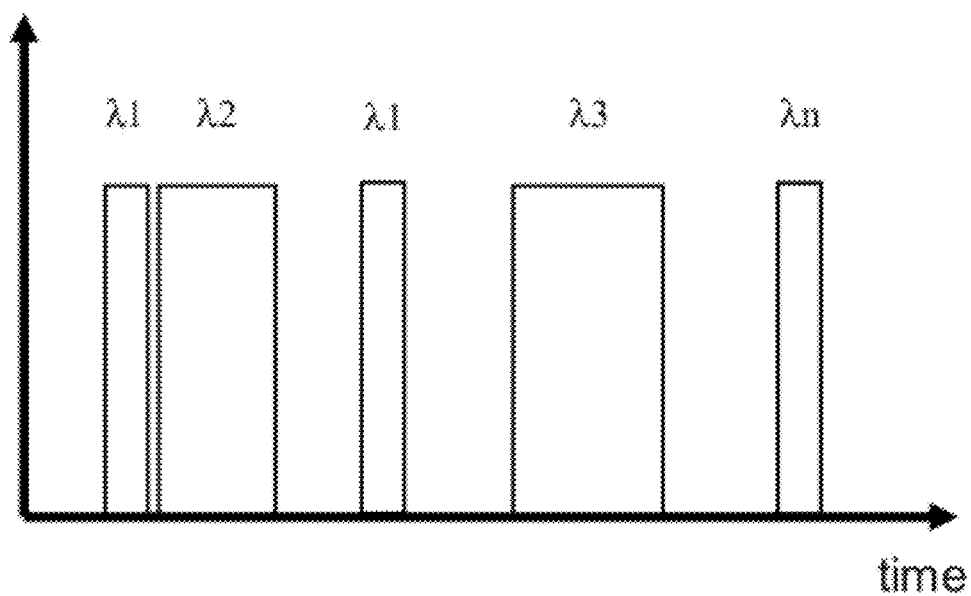

FIG. 12A is a graph illustrating the tailored spectrum obtained using the device of FIG. 11, with specific wavelength lines; FIG. 12B illustrates the temporal flexibility of the N different beams.

DESCRIPTION OF PREFERRED EMBODIMENTS

Embodiments of the present invention generally provide light beam generating methods and laser systems adapted for high power applications such as milling, micro-fabrication, drilling, memory repair and other material processing applications. It will be understood that embodiments of the present invention may also be used in other contexts such as remote sensing or in any other application that may benefit from optical light beams having well controlled spatial characteristics.

Laser System

The laser systems according to embodiments of the present invention are preferably, but not necessarily, fiber-based, at least in part, which is understood to mean that light circulating in the laser system is generally guided by optical fiber. It is however not excluded from the scope of the invention that the laser system may include components external to optical fibers. In addition, the components of the laser system may be embodied in more than one length of optical fiber, coupled together through known techniques such as fiber pigtails, fused coupling, mechanical couplers and the like.

The optical fiber or fibers embodying each components of the laser system may have any appropriate structure. Depending on its function, the optical fiber may be single mode or multimode, with a single or multiple cladding. It may be embodied by a standard fiber, a polarisation maintaining (PM) fiber, a microstructured (or "holey") fiber or any other appropriate specialized type of fiber. It may be made of any suitable materials such as pure silica, doped silica, composite glasses, sapphire or the like.

Referring to FIG. 1A, there is shown a laser system 20 according to one embodiment of the invention. The laser system 20 is adapted to generate an output light beam 58 having a target spatial pattern. The laser system 20 may be operated in pulsed regime, where the output light beam 58 is composed of light pulses, or it may be operated in continuous wave regime, providing a continuous output light beam 58. In other embodiments the laser system 20 may also provide a plurality of output light beams, in pulsed or continuous wave regime.

The expression "continuous wave" (CW) is understood herein to refer to a continuous electromagnetic radiation emission of slowly varying or constant envelope amplitude and having an indefinite duration. The expression "light pulses" is understood herein to refer to the discrete onset of electromagnetic radiation separated by an interpulse period where light is absent or negligible. Any given light pulse has optical characteristics which define it with respect to time, space and wavelength.

Figure 2A:
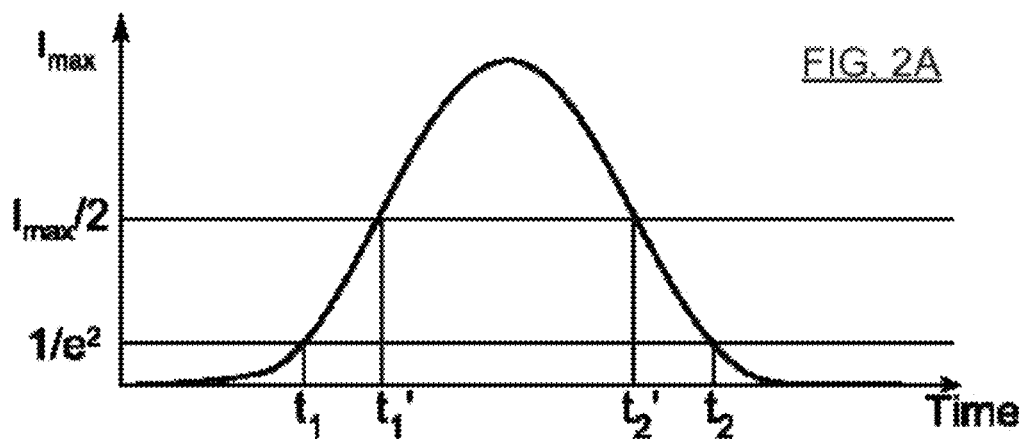
FIG. 2A illustrates an exemplary temporal profile of a light pulse and its measurement at various fractions of the maximum intensity.

With particular reference to embodiments where light pulses are produced, the intensity of light in a given pulse as a function of time over its duration is herein referred to as the temporal intensity profile or temporal profile. The term "pulse duration" generally refers to the period of time between the beginning and the end of an individual pulse. Several conventions can be used to determine the moment at which a light pulse begins and ends, as will be readily understood by one skilled in the art. For example, it can be determined accordingly to a given fraction, such as 50% or $1/e^2$ or any other fraction, of the maximum intensity of a simple pulse temporal profile. Referring to the example of FIG. 2A, times $t_1$ and $t_2$, determined at $1/e^2$ of the maximum intensity $I_{max}$, could respectively be used as the beginning and the end of the pulse, giving a pulse duration $T=t_1-t_2$. Alternatively, times $t_1'$ and $t_2'$ determined at 50% of the maximum intensity could be used, hence providing the pulse duration as the full width at half maximum (or FWHM) given by $T'=t_1'-t_2'$. In other variants, the pulse duration could be based on a different fraction of the maximum intensity or on the RMS intensity of a complex temporal profile. There are multiple definitions of the pulse duration as it is known by one skilled in the art and any such convention can be used without departing from the scope of the present invention.

In embodiments of the invention described herein, measured pulse durations can be of the order of nanoseconds or picoseconds, for example. One skilled in the art will however understand than longer or shorter pulses could alternatively be used depending on the requirements of a particular application.

A laser source generating light pulses of finite duration usually emits a plurality of light pulses per second, referred to a repetitively-pulsed regime. Hence, these pulsed laser sources may be characterized in time according to their repetition rate. Usually, this repetition rate is given in number of events per seconds and has the Hertz as unit. As an example, a pulsed laser source emitting 10 000 pulses per second has a repetition rate of 10 kHz. Multiple light pulses may also be regrouped as a periodic series of pulses, often referred to as a pulse train.

The spatial profile as a function of the spatial coordinates transverse to the direction of propagation is herein referred to as the irradiance of the light beam or the transverse irradiance distribution, whether in pulsed or continuous regime. In cases where a beam having a transverse irradiance distribution defined as $I_t$ is moving as a function of time in a periodic manner with a period T, the spatial profile is herein referred to as the average transverse irradiance distribution and is defined as:

$$\langle I \rangle = \frac{1}{T} \int I_i(t) dt$$

Figure 2B:
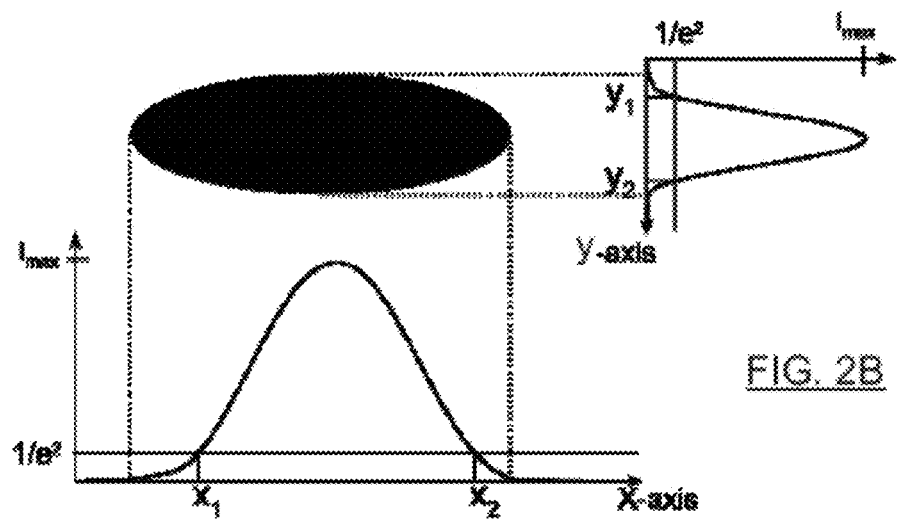
FIG. 2B illustrates an exemplary spatial profile of a light pulse and its measurement at $1/e^2$ of the maximum intensity.

Hence, the spatial profile can either be the transverse irradiance or the average transverse irradiance distribution. The term "beam width" generally refers to the spatial extent of the spatial profile of the beam in one direction between two points positioned on a line passing through the center of the beam and both representing the same fraction, such as 50% or $1/e^2$ or any other fraction, of the maximum irradiance of a simple spatial profile, as shown in FIG. 2B, or of the RMS intensity of a complex spatial profile. Referring to the example of FIG. 2B, positions $x_1$ and $x_2$ along the X-axis and $y_1$ and $y_2$ along the Y-axis of the transverse profile of the light beam would be used to determine its width at $1/e^2$ along both axis, which in the present example are not the same.

Figure 2C:
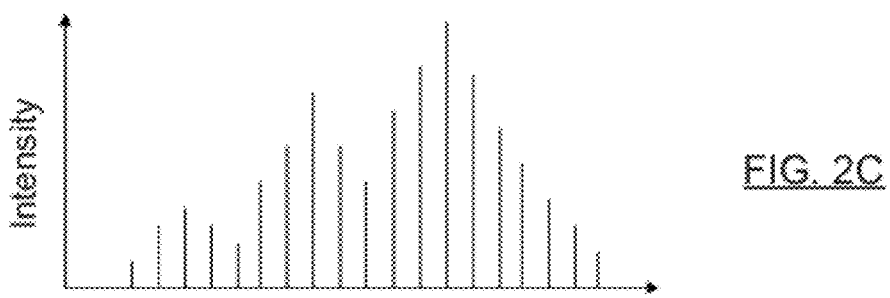
FIG. 2C illustrates a spectral profile having a plurality of discrete spectral lines with varying intensity; FIG.
Figure 2D:
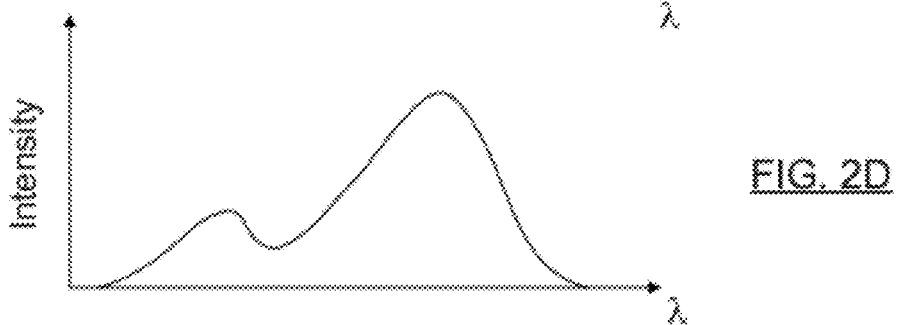

Also, every light beam has a characteristic spectral profile. This spectral profile may be simple, comprising a few discrete spectral lines, or it may be more complex, comprising a plurality of discrete spectral lines with varying intensity, as shown in FIG. 2C. It may also take the form of a continuous wavelength distribution, which may be simply shaped or be more complex, as shown in FIG. 2D. The term "spectral bandwidth" generally refers to the range of frequency or wavelength composing a spectral profile. According to the content and the complexity of the spectral profile, multiple methods exist to characterize the spectral bandwidth of a light emitting source, as known by one skilled in the art.

The expression "target spatial pattern" is understood herein to refer to a particular spatial light distribution that may vary in time and that is suitable to accomplish a specific task. As examples of target spatial pattern, one could be interested in generating a light beam spatial profile that is circular during a certain period of time and that is elongated in one direction during another period of time. One could also be interested in varying in time and/or in space the number and the position of discrete points of incidence of a light beam on a surface. Examples of target spatial patterns achievable using embodiments of the present invention are presented further below.

Figure 1B:
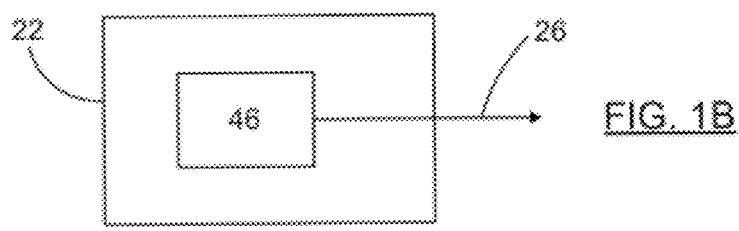
FIG. 1B illustrates a light generating module including a CW light source.
Figure 1C:
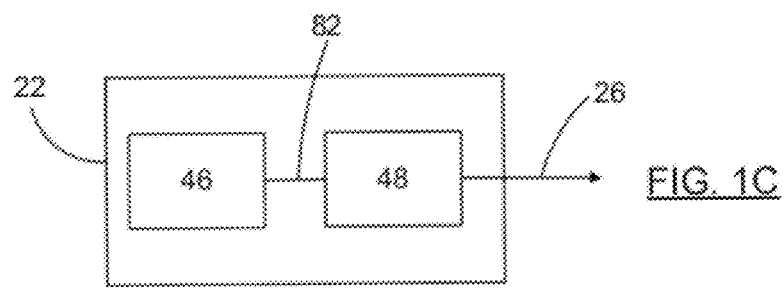
FIG. 1C illustrates a light generating module including a CW light source or a pulsed light source generating a light beam and an optical assembly modulating the amplitude of this light beam.
Figure 1D:
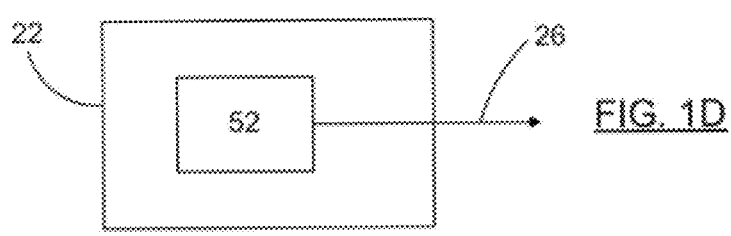
FIG. 1D illustrates a light generating module including a pulsed light source.

Referring back to FIG. 1A, the laser system 20 according to the illustrated embodiment of the invention first includes a light generating module 22 which generates an input light beam 26 which is characterized by a spectral profile 28. The light generating module 22 may include a continuous wave light source 46 generating the input light beam 26 in a continuous wave regime, as illustrated in FIG. 1B. Alternatively, the light generating module may operate in a pulsed regime, the input light beam 26 thereby including light pulses. In such a case, the light generating module may include a light source 46, which may be a continuous wave or a pulsed light source, generating a light beam 82 and an optical assembly 48 modulating the amplitude of the light beam 82 to provide the light pulses in the input light beam 26, as illustrated at FIG. 1C. The optical assembly 48 may for example include amplitude modulators opening and closing in a synchronized or partially synchronized manner to selectively allow light from the light beam 82 therethrough. The light generating module may alternatively be embodied by a pulsed source 52 directly generating the input light beam 26 in the pulsed regime, as illustrated in FIG. 1D. The light source, whether continuous or pulsed, may be embodied by any appropriate device such as, for example, a semiconductor laser diode of any appropriate configuration, such as a Fabry-Perot cavity, a distributed-feedback diode, an external-cavity diode laser (ECDL), etc. Of course, additional optical components may be provided in the light generating module, such as lenses, mirrors, gratings, polarization controllers or any other components directing or modifying the travelling light in an appropriate fashion. The light generating module 22 determines the characteristics of the input light beam 26 such as its spectral profile and intensity profile, as defined above. In the case of a light generating module operated in pulsed regime, the characteristics of the input light beam 26 also include the repetition rate and the pulse duration. In the embodiments discussed below, the spectral profile 28 of the input light beam 26 emitted by the light generating source 22 will be assumed to be characterised by a single laser line, although more complex spectral profiles could be considered without departing from the scope of the present invention. Also, in the remainder of this specification, the presentation of the various embodiments of the invention will preferably refer to laser systems operated in pulsed regime, although one skilled in the art will readily understand that its operation in continuous wave regime remains within the scope of the present invention.

Still referring to FIG. 1A, the laser system 20 further includes a spectral tailoring module (STM) 24 for providing a spectrally tailored light beam 30 by tailoring the spectral profile 28 of the input light beam 26. The STM 24 includes at least one phase modulator 44 imposing on the input light beam 26 a controllable phase modulation modifying the spectral profile 28 thereof. In the illustrated embodiment of FIG. 1A, a single phase modulator 44 is shown. One skilled in the art will however readily understand that the STM 24 may alternatively include a plurality of phase modulators 44a, 44b, 44c, etc arranged in cascade, as shown in FIG. 3, each applying a phase variation to the input light beam so that their combined effect on the phase of the input light beam results in the desired tailoring of its spectral profile 28.

Alternatively, referring to FIG. 4, the STM 24 may include an optical recirculation assembly 31 recirculating the spectrally tailored light beam for a plurality of passes through the phase modulator 44. The optical recirculating assembly 31 may include an optical circulator 32 having a first port 36 for receiving the input light beam 26, a second port 38 in communication with the phase modulator 44, and a third port 40 for outputting the spectrally tailored light beam 30. The optical recirculating assembly 31 may also include a reflective element 34 disposed in communication with the phase modulator 44 on a side opposite to the circulator 32 and reflecting the spectrally tailored light beam 30 toward the phase modulator 44. In such an embodiment, the phase modulator 44 is preferably controlled so that the consecutive passage of light therethrough provides the desired spectral tailoring.

The phase modulator 44 may be embodied by an electro-optic component based modulator such as that well known in the art. The electro-optic component included in the phase modulator may include an electro-optical material selected from the group consisting of $LiNbO_3$, $LiTaO_3$, $KNbO_3$ or any other appropriate nonlinear material. Alternatively, the phase modulator 44 may be based on an acousto-optical component such as an acousto-optic modulator.

As shown in FIG. 1A, the STM 24 preferably includes, for each phase modulator 44 of the STM 24, a corresponding phase modulator driver 42 providing a phase modulation drive signal 50 driving the activation of the phase modulator.

By the expression "controllable phase modulation", it is understood that the phase modulation function applied by the phase modulator can be adapted in time according to a target spectral tailoring to be accomplished on the input light beam. This phase modulation imposed on the input light beam preferably spreads the spectral profile 28 of input light beam 26 over a plurality of time-dependent spectral components. By the expression "time-dependent phase variation", it is understood that the STM 24 imposes a phase component on the electrical field of the input light beam 26 which is not constant in time or over the duration of each pulse in the input light beam. The time-dependent phase variation may be periodic, quasi-periodic, linear or have any other appropriate time-dependence. Preferably, the phase variation drive signal 50 is a RF (Radio Frequency) signal having at least one phase modulation drive signal frequency. More details on spectral tailoring through phase modulation can be obtained from DELADURANTAYE et al. (U.S. patent application published under no 2010/0128744), the contents of which are incorporated herein by reference in their entirety.

Still referring to FIG. 1A, the illustrated laser system 20 further includes a dispersion module 53 disposed downstream the STM 24 and receiving the spectrally tailored light beam 30. The dispersion module 53 includes at least one spatially-dispersive element 54, which has dispersion characteristics dispersing the spectrally tailored light beam to provide an output light beam having a spatial pattern which is a function of the spectral profile of the spectrally tailored light beam. The term "spatially-dispersive element" is understood herein to refer to an element that produces a spatial separation of the spectral components of an incident light beam by inducing a propagation angle which is a function of the respective wavelength of a given spectral component. This spatial separation usually lies on a single plane, but particular dispersive elements may produce different spatial separation geometries. The angle at which a particular spectral component is directed and the rate at which this angle changes as a function of the wavelength constitute some dispersive characteristics of the dispersive element, along with its spectral range of application and its mode of use.

The spatially-dispersive element 54 or elements of the dispersion module 53 may for example be embodied by one or more diffraction gratings, prisms, wavelength-division multiplexing modules (WDM or DWDM), or any other reflective or refractive dispersive element known in the art, or a combination thereof. Each spatially-dispersive element 54 may be disposed to transmit or to reflect the spectrally tailored light beam. The spatial pattern of the output beam 58 therefore depends on the tailored spectrum 56 and on the properties of dispersion module 53; it results that the spatial pattern can be tailored by the STM 24, thus by the RF temporal phase modulation signal 50. Hence, in the present embodiment of the invention, the phase modulation is selected in view of the spectral profile of the input light beam and of the dispersion characteristics of the at least one spatially-dispersive element so that the spatial profile of the output light beam matches the target spatial pattern therefor.

FIG. 5 shows an application of the invention where the output beam position 84 of the output light beam 58 varies as a function of time; the generation of instantaneous frequencies induced by the phase modulation 50 results in a variation of the beam dispersion angle as a function of time at the output of the dispersion module, here embodied by a spatially-dispersive element 54. Therefore, the average transverse irradiance distribution 60, and therefore the average beam width, of the output light beam 58 is tailored through the use of the STM 24. Indeed, the dispersion module ensures that the average output beam width depends on the spectral bandwidth and the power distribution of the tailored spectrum 56.

As an example, using a phase modulator available on the market, the spectral profile of a light beam at 1064 nm could be varied within a range of 0.5 nm. Using a 900 grooves/mm diffraction grating also available on the market, the output beam position could be changed by an angle of about 0.5 mrad. The resulting average irradiance distribution would then depend on the spectrally tailored light beam, thus the phase modulation function, and on the dispersion module characteristics.

Moreover, it is possible to vary the average beam width as a function of the time through a time-varying RF signal. FIGS. 6A and 6B illustrate a simple example where the output beam width is changed as a function of the time through the variation of the spectral bandwidth. As an example, FIG. 6A shows the spectral bandwidth 88 of the output beam as a function of time. Until time $t_A$, the spectrum of the output beam is composed of a single spectral line. During the time interval $t_A$ to $t_B$, the spectral bandwidth 88 is gradually increased by applying with the STM the proper phase variation as to broaden the spectral profile of the output beam. After time $t_B$, the broadening of the spectral profile is maintained. Accordingly, FIG. 6B shows the resulting average output beam width 90 as a function of time. As the average output beam width is directly related to the spectral bandwidth of the output beam in the present embodiment of the invention, the width of the output beam is narrow until time $t_A$, then increases between time $t_A$ and $t_B$ as the spectral profile of the output beam is broadened, and is kept constant after time $t_B$, as the spectral bandwidth is also kept constant.

This capability of tailoring the beam width is of significant interest for material processing since the beam shaping is fully controlled by the spectrum tailoring module. High-frequency changes of the beam shape are then possible, and without requiring any physical change in the optical system. Two different applications of the tailored beam shape technique are discussed below.

1) Control of the Width of Machined Grooves for Material Processing

Some applications of laser processing require that the width of a groove generated by multiple laser pulses may vary more or less rapidly along the scanning direction. The use of the beam shape tailoring method described above to modify the beam width in the direction perpendicular to the scanning axis results in an active control of the width of the groove, as shown in FIG. 7, without changing the optical system or making complex scanning.

2) Control of the Pulse-to-Pulse Overlap in Material Processing

Laser processing of materials often requires scanning the laser beam on a surface of a workpiece. As mentioned above, for such applications the pulse-to-pulse overlap is a critical parameter for the quality of the results as well as for the efficiency of the process. As shown in FIG. 8, using the beam shape tailoring method described above to change the beam width in the direction of the scanning axis results in an active control of the pulse-to-pulse overlap without changing the optical system or the displacement system. Alternatively, it can be used to accelerate the process while keeping the pulse-to-pulse overlap constant.

It will be understood that the examples above are given by way of illustration only and are in no way meant as limitative to the scope of the present invention.

FIG. 9 shows an embodiment of the invention in which the phase modulation 50 and the spectral filtering applied by a spectral filtering assembly 74 on the input light beam 26 by the STM 24 combined with the dispersive effect of the spatially-dispersive element 54 leads to the generation of N different light beams 62.

In this embodiment of the invention, the STM 24 of the laser system 20 comprises a spectral filtering assembly 74 downstream the phase modulator 44. To allow the spectrally-tailored light beam to propagate through the spectral filtering assembly 74, the spectral tailoring module includes a circulator 64 having a first port 76 for receiving the spectrally tailored light beam 30 from the phase modulator 44, a second port 78 in communication with the spectral filtering assembly 74 and a third port 80 for outputting the spectrally tailored light beam 30 subsequently to the filtering thereof by the filtering assembly 74. This spectral filtering assembly 74 may comprise a plurality of fiber Bragg gratings (FBGs) 66 disposed in series, each FBG being associated with a selected time-dependent spectral component, thereby filtering the spectrally tailored light beam 30. Delay lines 72 are disposed between consecutive FBGs of the series to provide a desired relative timing between the various spectral components outputted. One skilled in the art will readily understand that different optical configurations could be used to embody the spectral filtering assembly. For example, in one variant the spectral filtering assembly 74 may include a bulk spatially-dispersive element that spreads the incident spectrally tailored light beam onto a plurality of mirrors, placed at different distances of the bulk spatially-dispersive element, and which reflect back selected spectral components onto the bulk spatially-dispersive element. Then, this dispersive element spatially recombines the reflected spectral components as to create selected time-dependent spectral components, thereby filtering the spectrally tailored light beam. The term "bulk" is understood herein to refer to an optical component which is used in free-space propagation as opposed to a fiber-based optical component. Nevertheless, bulk optical components may easily be integrated to a fiber-based system by use, for example, of injection and collimation optical assemblies.

Still referring to FIG. 9, the spectral bandwidth 28 of the input light beam 26 is first increased through the STM 24, and it is then passed through the optical circulator 64 after entering by the first port 76. The sequence of N FBGs 66 connected to the second port 78 of the optical circulator 64 selects some specific wavelengths within the tailored spectrum 56, as shown in FIG. 10A. The selected wavelengths are reflected back to exit from the optical circulator through the third port 80. When the selected wavelengths 68 pass through the spatially-dispersive element 54, the output light beam can be spread over N different output dispersion angles 70, corresponding to the N wavelengths 68 selected from the action of the FBGs. This is equivalent to have N beams 62 that exit from the system time-delayed from each other, as also illustrated in FIG. 10B. The time delays depend on the exact phase modulation function 50 and on the delay lines 72 that separate the FBGs.

The phase modulation RF function 50 that would be required for simply increasing the spectral bandwidth of the laser source can be easily generated, which is an advantage of the embodiment described above. However, for some applications the wavelength selection using FBGs can suffer from the disadvantage of being fixed. As shown in FIG. 11, in an alternate embodiment, it is possible to generate multiple beams without the use of FBGs by using appropriate electronic RF signal functions 50 in order to obtain a tailored spectrum 56 that includes only the wavelengths that are really desired (FIG. 12A). Moreover, the specific wavelengths can be tailored through the STM 24 as a function of the time, giving the flexibility to actively adjust the dispersion angles 70 of the output light beams 62 as well as their temporal characteristics (FIG. 12B). This embodiment gives complete flexibility over the generation of multiple output light beams.

The generation of multiple output light beams using the phase modulation finds many applications in material processing. For instance, it could be used to generate N parallel grooves on a material with a very specific pattern along the scanning axis.

As one skilled in the art will readily understand, the embodiments described above as well as variants thereof may be adapted, modified or combined in order to provide an output beam matching a variety of desired spatial patterns.

Light Beam Generating Method

In accordance with another aspect of the invention, there is provided a method for providing an output light beam having a target spatial pattern. The method first includes generating an input light beam having a spectral profile, either in continuous wave or in pulsed regime. The spectral profile of the input light beam is then tailored by imposing on this input light beam a controllable phase modulation modifying the spectral profile thereof, thereby obtaining a spectrally tailored light beam. This spectrally tailored light beam is finally dispersed, using at least one spatially-dispersive element having dispersion characteristics, to provide an output light beam having a spatial pattern which is a function of the spectral profile of the spectrally tailored light beam. In this method, the phase modulation is selected in view of the spectral profile of the input light beam and of the dispersion characteristics of the at least one spatially-dispersive element so that the spatial pattern of said output light beam matches the target spatial pattern therefor.

As is readily apparent from the description above, the method according to the present invention may be used in the context of a variety of applications and adapted to a great number of desired target patterns. In one example, the spectral profile of the spectrally tailored light beam combined with the dispersion characteristics of the dispersive element can be used to provide a plurality of output light beams, each output light beam corresponding to a time-dependent spectral component. Alternatively or additionally, a control of the width of the output light beam in a direction perpendicular and/or parallel to a scanning axis can be provided. In other embodiments, the method of the present invention can be used to create or further to define output light pulses.

Of course, numerous modifications could be made to the embodiments described above without departing from the scope of the present invention as defined in the appended claims.

The invention claimed is:

1. A laser system for providing an output light beam having a target spatial pattern, the laser system comprising:
   a light generating module generating an input light beam having a spectral profile;
   a spectral tailoring module for providing a spectrally tailored light beam by tailoring the spectral profile of said input light beam, the spectral tailoring module comprising at least one phase modulator imposing on said input light beam a controllable phase modulation modifying the spectral profile thereof;
   a dispersion module disposed downstream the spectral tailoring module and receiving the spectrally tailored light beam therethrough, the dispersion module comprising at least one spatially-dispersive element, the at least one spatially-dispersive element having dispersion characteristics dispersing the spectrally tailored light beam to provide an output light beam having a spatial pattern which is a function of the spectral profile of the spectrally tailored light beam, wherein the phase modulation is selected in view of the spectral profile of the input light beam and of the dispersion characteristics of the at least one spatially-dispersive element so that the spatial pattern of said output light beam matches the target spatial pattern therefor.

2. The laser system according to claim 1, wherein, for each of said at least one phase modulator, the spectral tailoring module comprises a phase modulator driver providing a phase modulation drive signal driving an activation of the phase modulator.

3. The laser system according to claim 2, wherein said phase modulation drive signal is a Radio Frequency signal having at least one phase modulation drive signal frequency.

4. The laser system according to claim 1, wherein the at least one phase modulator comprises an electro-optic component, said electro-optic component comprising an electro-optic material selected from the group consisting of $LiNbO_3$, $LiTaO_3$ and $KNbO_3$.

5. The laser system according to claim 1, wherein the at least one phase modulator comprises an acousto-optic component.

6. The laser system according to claim 1, wherein the spectral tailoring module comprises a plurality of said phase modulators arranged in cascade.

7. The laser system according to claim 1, wherein the spectral tailoring module comprises an optical recirculation assembly recirculating said spectrally tailored light beam for a plurality of passes through said at least one phase modulator.

8. The laser system according to claim 7, wherein the optical recirculation assembly comprises:
an optical circulator having a first port for receiving said input light beam, a second port in communication with the at least one phase modulator, and a third port for outputting said spectrally tailored light beam; and
a reflective element disposed in communication with the at least one phase modulator on a side opposite to said circulator and reflecting said spectrally tailored light beam toward said at least one phase modulator.

9. The laser system according to claim 1, wherein the phase modulation imposed on said input light beam spreads the spectral profile of said input light beam over a plurality of time-dependent spectral components.

10. The laser system according to claim 9, wherein the spectral tailoring module comprises a spectral filtering assembly.

11. The laser system according to claim 10, wherein the spectral filtering assembly comprises a plurality of fiber Bragg gratings disposed in series, each fiber Bragg grating being associated with one of said selected time-dependent spectral components, thereby filtering said spectrally tailored light beam.

12. The laser system according to claim 11, wherein the spectral filtering assembly further comprises at least one delay line, each delay line being disposed between consecutive Bragg gratings of said series.

13. The laser system according to claim 10, wherein the spectral tailoring module includes a circulator comprising:
a first port for receiving said spectrally tailored light beam from the phase modulator;
a second port in communication with the spectral filtering assembly; and
a third port for outputting said spectrally tailored light beam subsequently to the filtering thereof by the filtering assembly.

14. The laser system according to claim 1, wherein the at least one spatially-dispersive element comprises at least one diffraction grating, at least one prism, at least one wavelength-division multiplexing module (WDM or DWDM) or a combination thereof.

15. The laser system according to claim 1, wherein the at least one spatially-dispersive element is disposed to transmit the spectrally tailored light beam.

16. The laser system according to claim 1, wherein the at least one spatially-dispersive element is disposed to reflect the spectrally tailored light beam.

17. The laser system according to claim 1, wherein the light generating module comprises a continuous wave light source generating the input light beam in continuous wave regime.

18. The laser system according to claim 1, wherein the light generating module operates in pulsed regime, the input light beam thereby comprising light pulses.

19. The laser system according to claim 18, wherein the light generating module comprises a light source generating a light beam and an optical assembly modulating the amplitude of said light beam to provide said light pulses in the input light beam.

20. The laser system according to claim 18, wherein the light generating module comprises a pulsed source directly generating said input light beam in pulsed regime.

21. A method for providing an output light beam having a target spatial pattern, the method comprising:
a) generating an input light beam having a spectral profile;
b) tailoring the spectral profile of said input light beam by imposing on said input light beam a controllable phase modulation modifying the spectral profile thereof, thereby obtaining a spectrally tailored light beam;
c) dispersing, using at least one spatially-dispersive element having dispersion characteristics, said spectrally tailored light beam to provide an output light beam having a spatial pattern which is a function of the spectral profile of the spectrally tailored light beam,
wherein the phase modulation is selected in view of the spectral profile of the input light beam and of the dispersion characteristics of the at least one spatially-dispersive element so that the spatial pattern of said output light beam matches the target spatial pattern therefor.

22. The method according to claim 21, wherein the spectral profile of said spectrally tailored light beam combined with the dispersion characteristics of the dispersive element provides a plurality of output light beams, each output light beam corresponding to a time-dependent spectral component.

23. The method according to claim 21, wherein the spectral profile of said spectrally tailored light beam combined with the dispersion characteristics of the at least one spatially-dispersive element provides a control of the average beam width of said output light beam in a direction perpendicular to a scanning axis.

24. The method according to claim 21, wherein the spectral profile of said spectrally tailored light beam combined with the dispersion characteristics of the at least one spatially-dispersive element provides a control of the average beam width of said output light beam in a direction parallel to a scanning axis.

25. The method according to claim 21, wherein the generating said input light beam of
a) comprises generating the input light beam in continuous wave regime.

26. The method according to claim 21, wherein the generating said input light beam of
   a) comprises generating the input light beam in pulsed regime, the input light beam thereby comprising light pulses.

27. The method according to claim 21, wherein the output light beam comprises light pulses.

* * * * *